A. L. MITCHELL.
SHOCK ABSORBER.
APPLICATION FILED FEB. 3, 1910.

994,024.

Patented May 30, 1911.

Witnesses:

Inventor:
Arthur L. Mitchell
by S. W. Bates
Atty.

UNITED STATES PATENT OFFICE.

ARTHUR L. MITCHELL, OF PORTLAND, MAINE.

SHOCK-ABSORBER.

994,024. Specification of Letters Patent. Patented May 30, 1911.

Application filed February 3, 1910. Serial No. 541,804.

*To all whom it may concern:*

Be it known that I, ARTHUR L. MITCHELL, a citizen of the United States of America, and a resident of Portland, in the county of Cumberland, State of Maine, have invented certain new and useful Improvements in Shock-Absorbers, of which the following is a specification.

My invention relates to a shock absorber for spring supported vehicles and it is particularly designed to be used on the so-called "Ford" automobiles in which the body of the car is supported on leaf springs located directly above the axles although the invention is capable of being otherwise used.

I have illustrated my invention by means of the accompanying drawing in which is shown my shock absorber applied to both the forward and rear axles of the "Ford" car.

Figure 1:
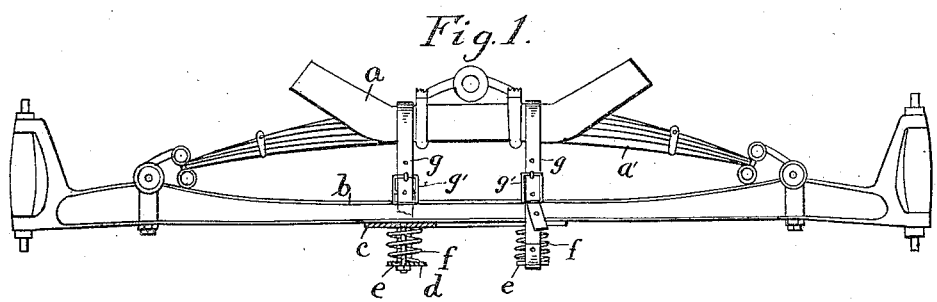
Figure 2:
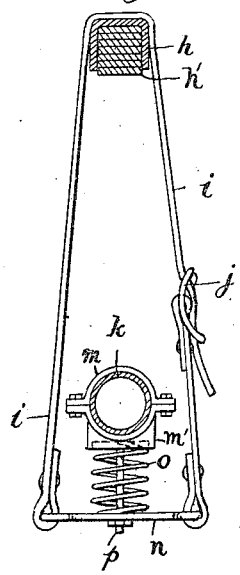

In the drawing, Figure 1 is a front elevation of the front axle of the "Ford" car showing the axle and adjacent parts with my device applied, and Fig. 2 is a transverse section through the rear axle showing a modification of the device adapted to be applied to the rear axle.

Referring to Fig. 1, $b$ is the front axle of the car, $a'$ the semi-elliptical leaf spring vertically disposed above the axle and $a$ is the bolster.

In the application of my device to the front axle, I make use of an elongated bearing member adapted to be held beneath the axle. As here shown, this bearing member is in the form of an elongated plate $c$ which fits beneath the axle, and beneath each end of the plate $c$ there is a plate $d$ extending transversely of the axle and being provided with a central vertical opening. The vertical motion of the plate $d$ is guided by a bolt $e$ which is secured by its upper end to the plate $c$ with its lower end extending through the plate $d$ and being provided with a nut therebeneath. The upward thrust of the spring is relieved by a spiral spring $f$ which surrounds the bolt $e$ and is disposed between the plate $d$ and the plate $c$. The plate $d$ is connected with the body of the vehicle so that the upward motion of the latter is taken up by the spring. As here shown, a strap $g$ is secured by one end at each end of the plate $d$ and each strap extends up over the bolster one on each side of the center, embracing the axle and the spiral spring. A buckle $g'$ is provided by which the two parts of the strap are united and by which the device is secured in place.

Referring to Fig. 2, $k$ represents the housing of the rear axle and $h$ is the bolster and $h'$ the spring.

The shock absorber comprises a bearing member composed of a socket $m'$ provided with a clamping device $m$ for clamping the socket $m'$ to the rear axle. Beneath the socket $m'$ is the plate $n$ having a vertical opening through which passes the bolt $p$ which is secured to the socket $m'$ and the spiral spring $o$ surrounds the bolt $p$ and is interposed between the plate and the socket. The strap $i$ extends from each end of the plate $n$ over the bolster $h$ and is provided with a buckle $j$.

In using my device, it is strapped on the forward or rear axle or both, one device on each side of the center in the rear and the double device shown in Fig. 1 in the front. When the upward rebound of the spring takes place, the motion is transferred through the strap and thence to the plates $d$ and $n$ which compress their springs.

The device is simple and easily applied and all the stress is taken by the spiral spring on compression.

I claim:—

1. A shock absorber for vehicles comprising a plate disposed at right angles to the axle of a wagon, a spring interposed between the axle and the plate at their intersecting point, and a substantially triangular member astride the bow spring of the axle and having its divergent ends connected to the ends of said plate whereby a slight arcuate movement on said plate is permitted.

2. A shock absorber for vehicles comprising an elongated plate adapted to bear against the under side of an axle and extending parallel therewith, spaced bolts depending from and rigidly secured to the plate, a coiled spring upon each bolt, a plate upon each bolt disposed at right angles to said elongated plate and adapted to support the spring against said elongated plate, and angular yokes having their divergent ends connected to said second-named plates and having their apices adapted to rest over a bow spring mounted on the axle.

3. A shock absorber for vehicles comprising an elongated plate adapted to bear against the under side of an axle and extending parallel therewith, spaced bolts depending from and rigidly secured to the plate, a coiled spring upon each bolt, a plate upon each bolt disposed at right angles to said elongated plate and adapted to support the spring against said elongated plate, and an adjustable strap having its ends fastened to the ends of said second plate and having its central portion extending over a bow spring on the axle.

In witness whereof I have hereunto set my hand this 29th day of January, 1910.

ARTHUR L. MITCHELL.

Witnesses:
S. W. BATES,
ELEANOR W. DENNIS.

Copies of this patent may be obtained for five cents each, by addressing the "Commissioner of Patents, Washington, D. C."